Figure 1:
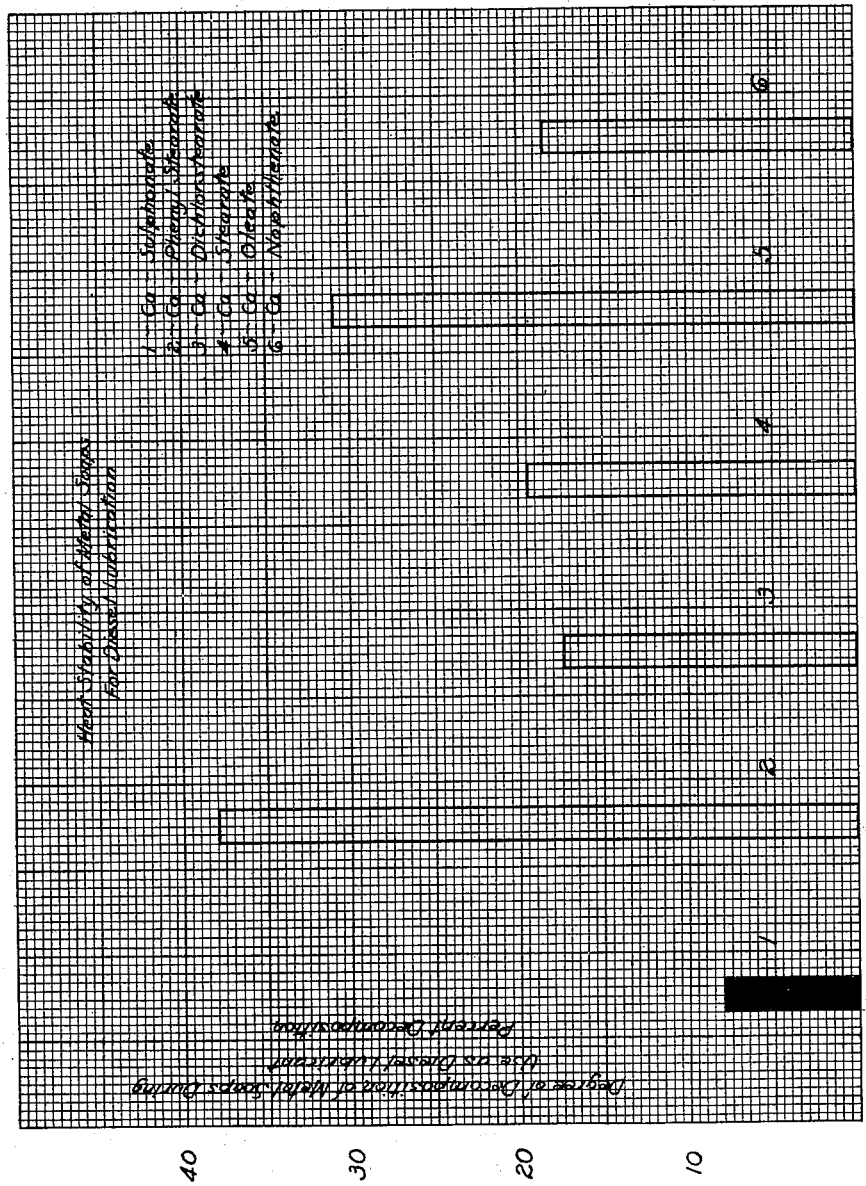

Dec. 16, 1941.    A. LAZAR ET AL    2,266,325
LUBRICATING COMPOSITION AND PROCESS OF PREPARING SAME
Filed Feb. 21, 1938    5 Sheets-Sheet 1

INVENTORS
ARTHUR LAZAR
PAUL M. RUEDRICH
BY
ATTORNEY.

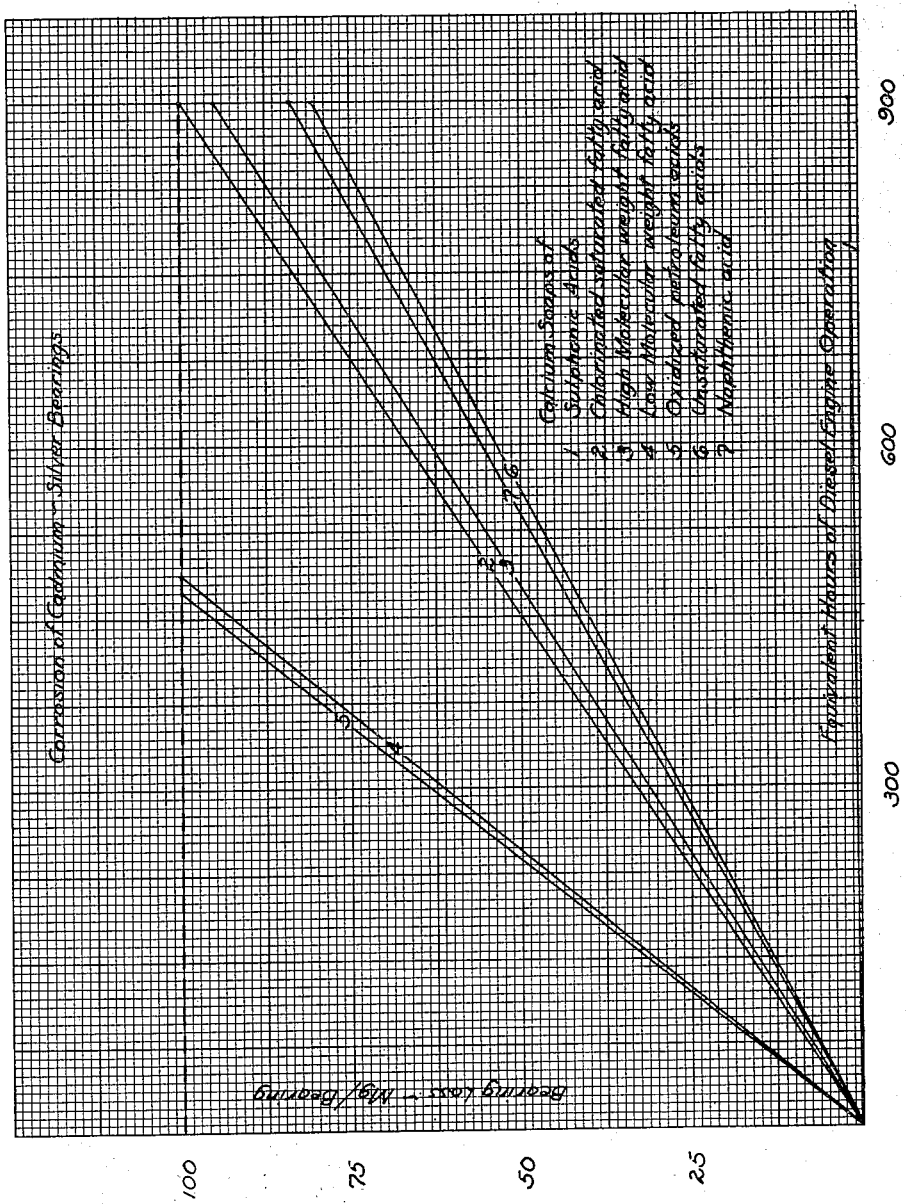

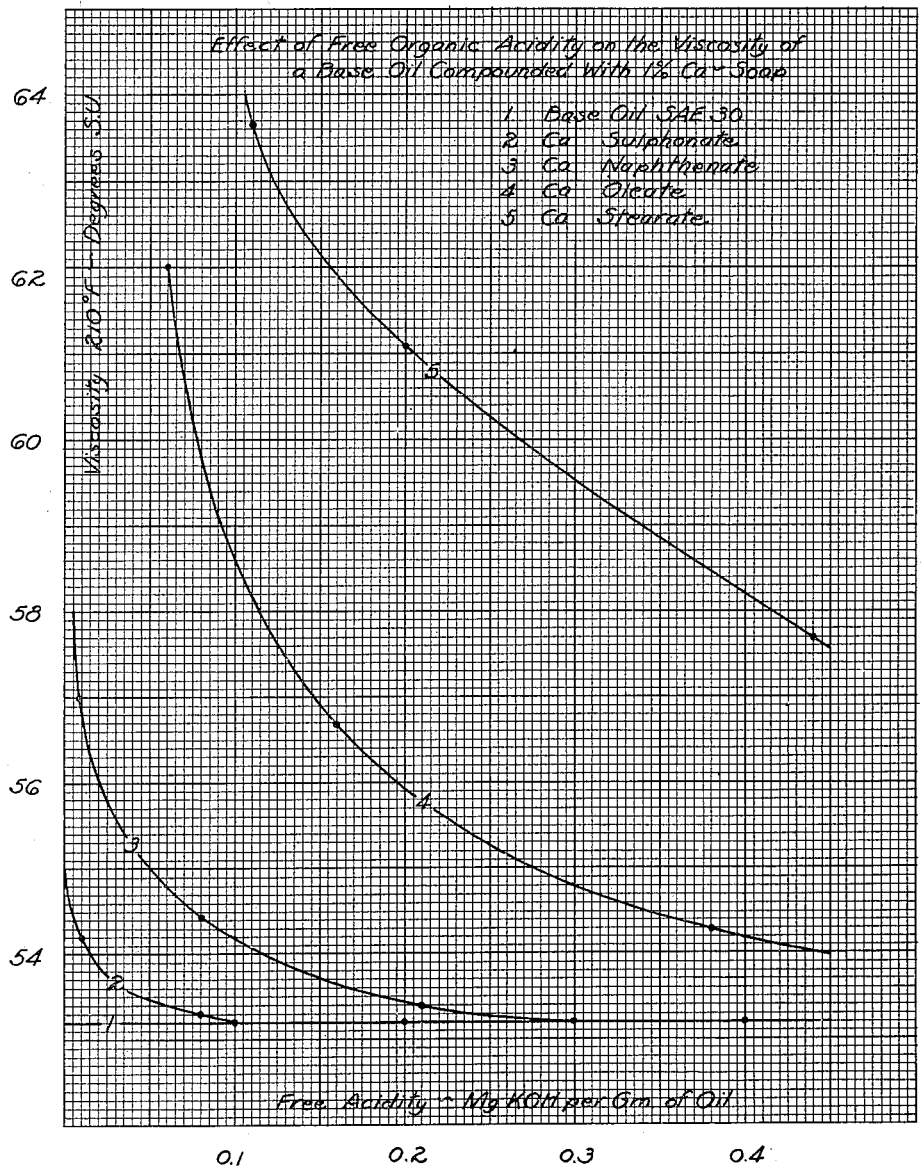

Patented Dec. 16, 1941

2,266,325

UNITED STATES PATENT OFFICE 2,266,325

LUBRICATING COMPOSITION AND PROCESS OF PREPARING SAME

Arthur Lazar and Paul Moritz Ruedrich, Berkeley, Calif., assignors to Tide Water Associated Oil Company, San Francisco, Calif., a corporation of Delaware Application February 21, 1938, Serial No. 191,742

6 Claims. (Cl. 252—33)

This invention relates to improvements in lubricants and has for a principal object the provision of a lubricating oil having superior non-sludging characteristics when employed under the conditions of high temperature and pressure met in internal combustion engines.

A second object of the invention is to provide a lubricant which is non-corrosive to alloy bearings.

Other objects of the invention will become apparent as the invention is hereinafter disclosed.

The invention is applicable to the lubrication of all internal combustion engines but particularly to the high speed Diesel engine, as well as air-cooled, high performance, high output, aeroplane engines.

In the lubrication of the high speed Diesel engine, problems relative to adequate oiliness, carbon formation and wear are multitudinous, and such problems have not been successfully solved heretofore. This invention provides a compounded lubricant which (1) has excellent oiliness characteristics, (2) substantially prevents carbon deposition, and (3) minimizes wear. In addition, the product serves other important functions which will be evident from the description which will now be made.

When lubricating oils, as now marketed, are used to lubricate Diesel engines, excessive deposits of carbon and resinous materials are formed. Such deposition usually takes place behind the piston rings and in the oil control ring slots of the piston. The first condition is conducive to the clamping of the compression ring in its groove thus impairing the freedom of movement so essential to the maintenance of maximum compression, power, and freedom from excessive blowby gases entering the crankcase. Deposits behind the compression rings may also cause the piston ring to be forced outward against the cylinder liner, causing excessive wear and the scoring of both the piston ring and cylinder liner and even ultimate seizing.

Deposits in the oil control ring slots of the piston are deleterious to the action of said rings in that they obstruct the free flow of oil from the cylinder wall through the oil ducts in the piston proper to the crankcase.

In addition to the depositions above cited, sludgy materials accumulate in the crankcase itself. Such sludge is circulated with the oil through the crankshaft and oil distribution system, ultimately settling out to clog the oil ducts which supply vital moving parts. Sludge formation is often of sufficient magnitude to clog the oil screens situated on the suction side of the main oil supply pump and thus diminish or retard entirely the flow of oil.

Wear of moving parts, when suitable lubrication is not applied, usually takes place on the rings and cylinder liners. Such wear may be due to the lack of film strength or metal affinity of the lubricant, or may be caused by carbonaceous depositions behind the rings, etc., as previously discussed, or both.

The sludging of an oil during use is a direct result of the processes of oxidation and polymerization. In high speed automotive equipment an oxidizing atmosphere is always present, particularly in compression-ignition engines in which high air-fuel ratios are employed.

Depositions of decomposition products which cause ring sticking are herein termed lacquer formations, due to the similarity of such materials to a coating of black lacquer wherein the deposition of lacquer is also a result of similar processes of oxidation and polymerization, the difference between lacquer and sludge formations being merely a matter of the degree of completion of such processes. The lacquer, acting as a binder, combines with carbonaceous materials on the piston rings causing the phenomenon of ring sticking.

Certain metal soaps have been used heretofore to retard the process of oxidation. Such action is believed to be due to the metal soap functioning as an acceptor for oxygen to act as an oxidation preventive or inhibitor. Although such a stabilization feature is of prime importance, another important requirement is that the compounded lubricant must be substantially non-corrosive to vital engine parts.

In the development of high speed engines the use of babbitt metal bearings is now being increasingly discontinued on account of their low melting points and fatigue factor. Alloy bearings now being used, such as those of copper-lead and cadmium-silver type, are resistant to structural fatigue, softening and crushing. In the choice of a lubricant care must be taken to assure the case of one which will not be corrosive to such alloy bearings. The use of metal soaps in oils has in most cases caused serious corrosion to bearings, the injury being caused by actual chemical attack, inducing pitting, which weakens the bearing structure causing failure of these vital engine parts. The need for a lubricant which will stabilize the oil and is also non-corrosive to alloy bearings, is therefore evident.

This invention provides that when certain metal soaps of sulphonated products are added to lubricating oil, superior stabilizing properties result, and, in addition, the lubricant is substantially non-corrosive to alloy bearings. These soaps are particularly adaptable to the problem due to their:

1. Miscibility with oil in all proportions
2. Heat stability
3. Oxidation inhibiting characteristics
4. Oiliness characteristics 5. Non-corrosive properties The combination of features outlined above distinguish the soaps of this invention from other soaps which have been employed as stabilizing agents. Metal sulphonate soaps exhibit superior properties in each of these five essential requirements.

For example, metal soaps, derived from acids other than sulphonic acids, have merit as oxidation inhibitors, but their application is usually limited due to some deficiency as (1) low oil solubility, (2) stability of the soap itself under severe temperature conditions, (3) oiliness characteristics. Metal sulphonates as used herein not only eliminate such deficiencies to a marked degree, but, in addition, impart (1) improved metal affinity, (2) penetrating and spreading properties, (3) non-corrosive characteristics; (1) and (2) above being due to a material reduction of the surface tension of the base oil.

In the accompanying figures, numbered 1 to 5 inclusive, are shown graphically several advantages of calcium sulphonates as compared to calcium soaps of other organic acids, all of which is hereinafter more fully set forth.

An illustration of the practical application of the herein described new product will demonstrate its striking qualities. Diesel powered units were operated on a conventional type lubricating oil for one thousand hours. Before the end of this period troubles of the kind previously discussed were evident. The same Diesel equipment when using the product of this invention operated for over three thousand hours without any troubles whatever.

The addition of metal sulphonates to the base oil stabilizes the lubricant so that under severe operating conditions excessive sludge formation is prevented. The soap acts as a protective colloid for whatever carbonaceous and sludgy materials may be formed thus holding in a finely divided state all suspended matter and substantially preventing deposition of the same. In this way the suspended matter can be easily disposed of with the used oil on periodic drainage.

The base oil to which the metal sulphonate is added may be a lubricating fraction from paraffinic, naphthenic, or mixed base, crude oils. Such lubricating stock may be processed by conventional acid treating methods, or may be highly refined by means of any of the solvent refining processes well known in the art, such as with liquid sulphur dioxide or like solvents, or combinations of solvent and acid refining may be used. Any or all of these refining operations may be employed, the specifications for the base oil being limited only by the qualifications placed on the compounded lubricant subsequently derived therefrom by the addition of metal sulphonates.

It should be especially noted that, heretofore, the use of the paraffinic type base mineral oils has been avoided in the manufacture of compounded lubricants and the reason for this is that none of the metal soaps heretofore known or used for the purpose exercise sufficient inhibiting power on paraffinic hydrocarbons to prevent the undesired excessive oxidation and the formation of lacquer-like deposits resulting in ring sticking.

As one feature particularly distinguishing the present invention, it has universal application to all types of mineral oils having different bases, including the paraffinic type heretofore found unsuitable. This universality of application results from the use of metal sulphonates, the overwhelming superiority of which over other metal soap inhibitors is clearly exemplified herein.

Sulphonate soaps are miscible with the base oil in substantially all proportions. Further, the addition of metal sulphonates does not increase the viscosity of the compounded lubricant in the same proportion as other metal soaps do, but may be incorporated in relatively large percentages and still maintain a fluid lubricant. In accomplishing the stabilization feature it is often essential to prepare a product containing a high percentage of metal soap and the advantages of metal sulphonates for such application will be evident from the following data in which calcium soaps have been given merely as special examples for illustration.

| Soap | Miscibility of paraffine oils | Miscibility in oils of asphaltic origin |
|---|---|---|
| Calcium sulphonate | More than 50% | More than 50% |
| Calcium naphthenate | 4.0% max | 10% max |
| Calcium oleate | 0.5% max | 1% max |
| Calcium stearate | 0.2% max | 0.4% max |
| Calcium palmitate | 0.1% max | 0.3% max |

The superiority of the sulphonates in the feature of compatibility is self evident from the above table.

As mentioned previously one of the problems connected with engine operation is the phenomenon of a dark lacquer-like deposit on the piston's skirt and ring lands. If such formation is of soft structure it is removed by mechanical action, whereas if hard carbonaceous material is formed, a build-up of such deposit takes place. In the use of some lubricants hard, tenacious lacquer-like deposits are formed on the ring lands, piston skirt, and behind the piston rings. Such deposits cause ring sticking, wear of rings and abrasion of the cylinder liners. The degree of hardness of the lacquer formation is therefore of note in the choice of a metal soap to incorporate in the oil. It is found that when metal sulphonates are used these formations are of softer structure and consequently less build-up of undesirable deposits takes place.

The hardness of the carbonized lacquer deposits, which were formed in the ring grooves on runs with a variety of lubricants, was measured by means of the force required to break the surface with a steel needle. Taking as 100% the force required to break the deposit formed when operating on the base oil only, relative degrees of hardness were set up for compounded oils in which metal soaps were incorporated. Data obtained are tabulated below, again using calcium soaps as examples.

| | Base oil+1% by weight of— | Relative hardness |
|---|---|---|
| | | Percent |
| 1 | Calcium sulphonate | 40 |
| 2 | Calcium oleate | 80 |
| 3 | Calcium naphthenate | 60 |
| 4 | Calcium stearate | 70 |
| 5 | Calcium dichlorstearate | 55 |

Whatever deposit is formed when using a calcium sulphonate compounded oil is of a softer nature than that formed by other calcium soap lubricants.

In the preparation of a lubricant containing metal soaps it is essential that the metal soap itself should have the property of high heat stability. If the soap decomposed during usage, there would be a liberation of free acidic compounds and consequently a corrosive oil would result. Various metal soaps were subjected to the temperature conditions encountered under heavy load in Diesel engines, and the degree of soap decomposition measured. The stability of a number of calcium soaps is shown in Fig. 1. The soaps numbered 1 to 6 therein are 1. Calcium sulphonate
2. Calcium phenylstearate
3. Calcium dichlorstearate
4. Calcium stearate
5. Calcium oleate
6. Calcium naphthenate.

It will be noted from Fig. No. 1 that the metal sulphonates exhibit remarkable relative heat stability characteristics when compared to other known metal soaps under similar working conditions.

Figure 2:
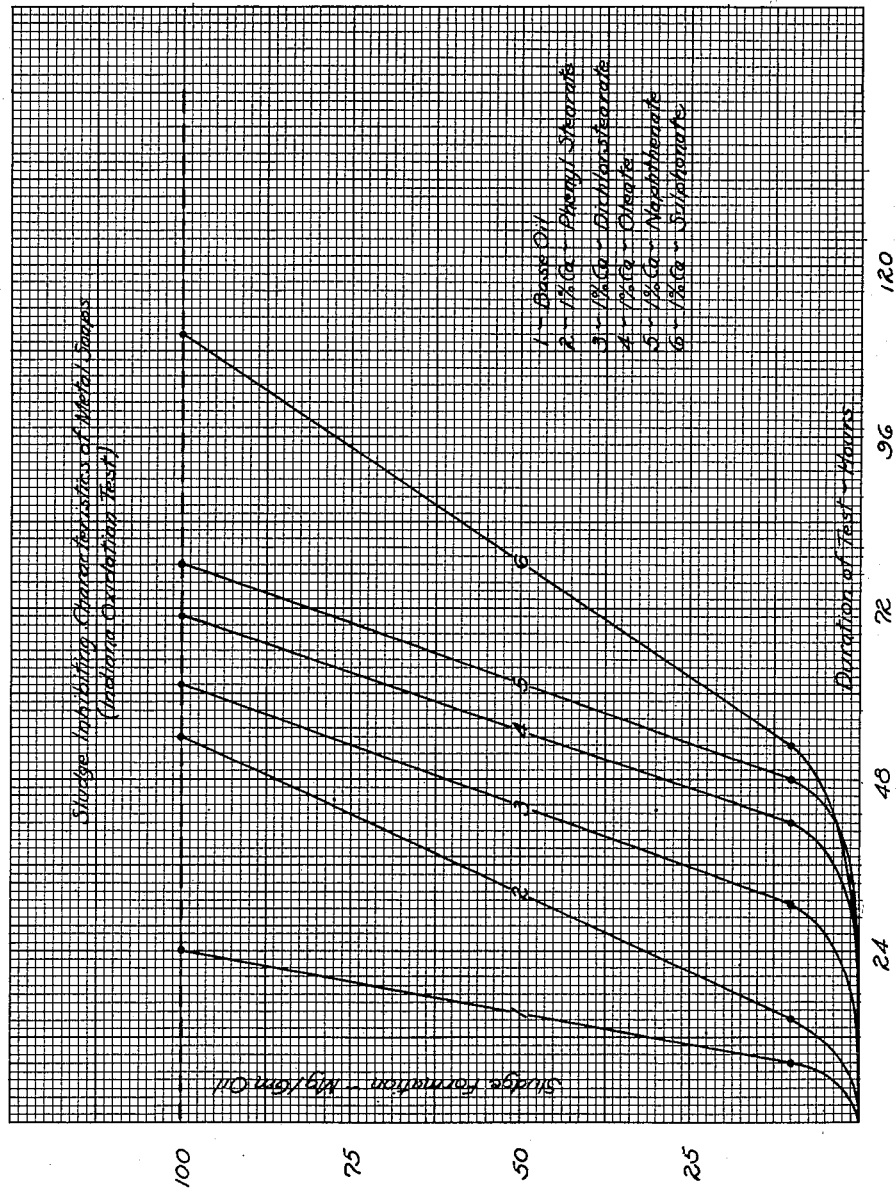

As discussed hereinbefore, one of the major functions of the metal soaps is to inhibit the formation of sludge. A recognized test for determining the sludge forming tendency of lubricating oils is the Indiana oxidation test which exposes oils to the action of heat and air under specified conditions. In this test the action of heat and air upon the oil is such that oil deterioration is accelerated but still is correlative to engine performance. Lubricants containing various calcium soaps were subjected to this accelerated test and the results are plotted in Fig. 2, in which sludge formation, measured as milligrams of sludge per gram of oil, is plotted against hours of exposure. The superiority of the metal sulphonates in respect to resistance to deterioration is clearly indicated by a comparison of deterioration curve No. 6 with the curves of the other metal soaps in Fig. 2.

Up to this point it has been shown that the metal sulphonates are (1) completely miscible with oils in large proportions, (2) superior in heat stability properties, (3) excellent stabilizing agents possessing high sludge inhibiting characteristics. These properties are naturally of primary importance, yet in addition to such properties another feature which has become increasingly important since the advent of alloy bearings, is the relatively non-corrosive action of metal sulphonates on such alloy bearings. This feature is illustrated in the following table in which data are presented for lubricants containing 1% by weight of various calcium soaps. The corrosion to copper lead bearings, for example, taken as the loss in weight of the bearing, is expressed on an arbitrary scale and illustrates the relative merits of the various soaps tested in this respect.

| Lubricant containing | Corrosion to copper-lead bearings expressed on arbitrary scale | |
| --- | --- | --- |
| | Paraffine base oil | Naphthene base oil |
| Base oil only | 130 | 34 |
| 1% calcium sulphonate | 45 | 10 |
| 1% calcium naphthenate | 580 | 320 |
| 1% calcium oleate | 450 | 230 |
| 1% calcium stearate | 260 | 140 |
| 1% calcium palmitate | 390 | 210 |
| 1% calcium dichlorstearate | 230 | 130 |
| 1% calcium phenylstearate | 210 | 120 |

From the foregoing table two facts are outstanding:

First, that the paraffinic oils, whether compounded or not, are more corrosive to alloy bearings than the naphthenic oils. Second, that in every case of naphthenic oils compounded with previously known metal soaps, the corrosive characteristics of the base oil have been increased while the same is true in many instances with the paraffinic oils.

On the contrary, as strongly distinguishing the action of the present invention, the foregoing table shows that the only calcium soap capable of materially reducing the corrosiveness of both paraffinic and naphthenic base oils is the calcium sulphonate which decreases the corrosive action of naphthenic base oils about 70% and of paraffinic base oils about 65%.

In the practice of this invention metal sulphonates of sodium, calcium, lithium, barium, potassium, manganese, magnesium, strontium, cadmium, aluminum, zinc, lead, copper, chromium, iron, cobalt, nickel, tin, molybdenum, bismuth, antimony, mercury, and silver may be used. In general, polyvalent metal soaps and particularly those of the alkaline earth metals (i. e., calcium, strontium, barium, magnesium), and the earth metals (e. g., aluminum and chromium) which have been found to show all the desirable features combined to the highest degree, are preferred to be used.

Such metal sulphonates stabilize the lubricant and minimize operating difficulties caused by sludge formation. In addition, the metal sulphonates reduce corrosive action on alloy bearings. Metal naphthenates have been thought heretofore to be superior stabilizing agents and a comparison of such materials with our product on the corrosive feature, will set forth more specifically the application of our product for the dual function desired.

| Lubricant A containing 1.0% of each soap | Corrosion to copper-lead bearing expressed in arbitrary scale | | Lubricant B containing 1.0% of each soap |
| --- | --- | --- | --- |
| | Lubricant A | Lubricant B | |
| Calcium naphthenate | 320 | 10 | Calcium sulphonate. |
| Magnesium naphthenate | 570 | 35 | Magnesium sulphonate. |
| Strontium naphthenate | 300 | 9 | Strontium sulphonate. |
| Barium naphthenate | 340 | 12 | Barium sulphonate. |
| Lead naphthenate | 720 | 45 | Lead sulphonate. |
| Cadmium naphthenate | 660 | 40 | Cadmium sulphonate. |
| Copper naphthenate | 750 | 60 | Copper sulphonate. |
| Chromium naphthenate | 530 | 41 | Chromium sulphonate. |
| Aluminum naphthenate | 410 | 32 | Aluminum sulphonate. |
| Tin naphthenate | 680 | 70 | Tin sulphonate. |
| Iron naphthenate | 520 | 38 | Iron sulphonate. |

The above tabulation illustrates the superior non-corrosive properties of the metal sulphonates and shows that the naphthenate is over three times as corrosive as the sulphonate of the same metal when used under comparable conditions.

To illustrate the actual loss of weight of alloy bearings as a result of corrosion, lubricants containing 0.9% calcium soaps were subjected to accelerated conditions correlative with Diesel engine operation and the time required to remove by corrosion 100 milligrams of bearing metal determined. Such results are shown in the table below.

Bearing corrosion

| Diesel lubricant compounded with 0.9% calcium soap of the following acids | Bearings | | | |
|---|---|---|---|---|
| | Copper lead | | Cadmium-silver | |
| | Equivalent hrs. engine operation | Bearing loss, mg. | Equivalent hrs. engine operation | Bearing loss, mg. |
| 1 Sulphonic acid | 900 | 7.6 | 900 | 0.6 |
| 2 Chlorinated saturated fatty acid | 940 | 100 | 900 | 100 |
| 3 High molecular weight fatty acid | 820 | 100 | 950 | 100 |
| 4 Low molecular weight fatty acid | 560 | 100 | 490 | 100 |
| 5 Oxidized petroleum acids | 530 | 100 | 480 | 100 |
| 6 Unsaturated fatty acids | 490 | 100 | 1,130 | 100 |
| 7 Naphthenic acid | 360 | 100 | 1,060 | 100 |

Figure 3:
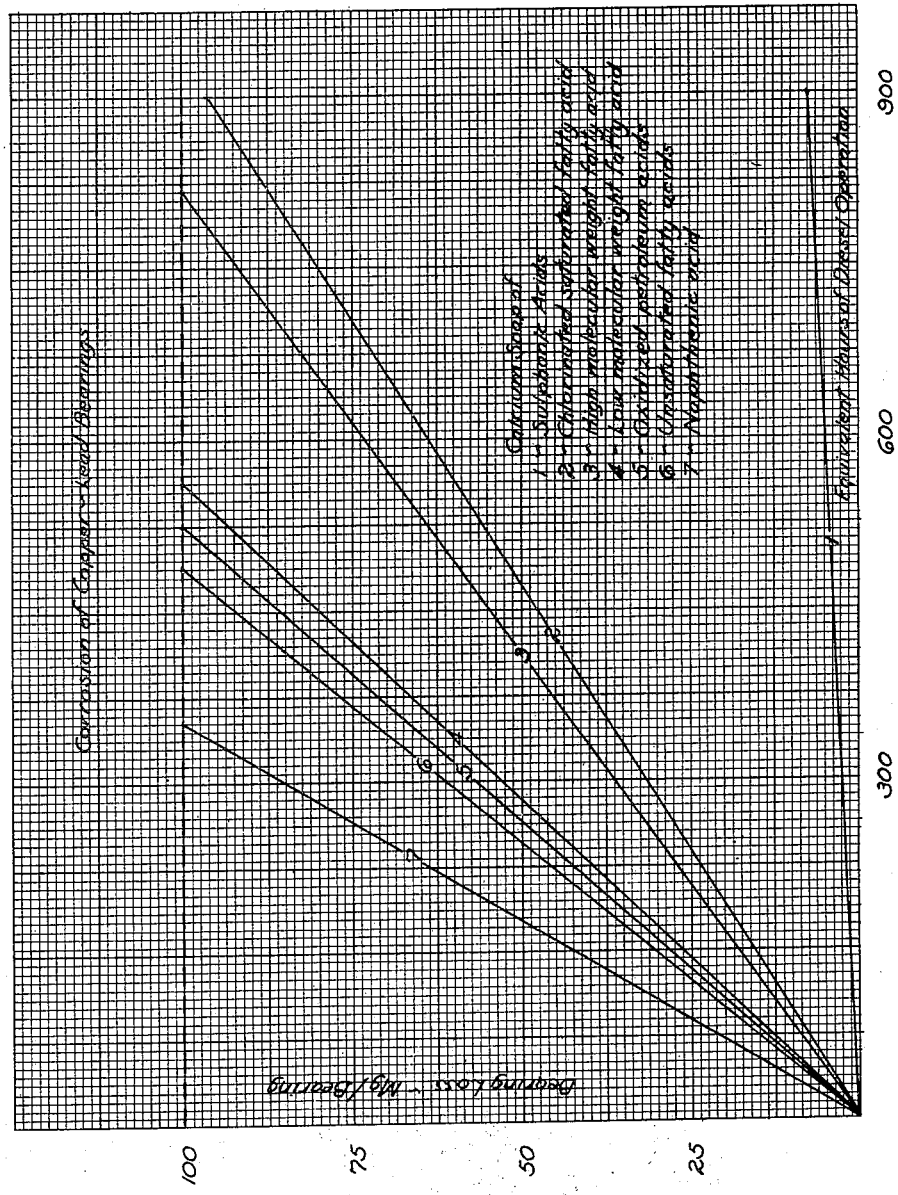

These results are represented graphically in Figs. 3 and 4.

Data so presented illustrate conclusively that metal sulphonates are far less corrosive than other metal soaps.

In the preparation of the metal sulphonates employed, any sulphonic acid may be used which will yield an oil soluble metal soap that will stabilize the lubricant. Sulphonation of animal, vegetable, fish, and hydrogenated fish oils have yielded sulphonic acids amenable to use in this invention. Sulphonation of organic acids, as for example, naphthenic and fatty acids, has yielded products containing both the sulphonic and carboxylic groups, which are of value for special uses. In general, however, due to the factors of availability and economy it is preferred to use sulphonic acids derived from sulphuric acid treatment of petroleum fractions. Of these, the sulphonic acids obtained by the sulphonation of lubricating oil fractions of 45 to 350 viscosity, Saybolt Universal at 100° F., are preferred, although the invention requires only that the metal sulphonates subsequently made from sulphonic acids shall stabilize the oil and any sulphonic acids so adaptable may be used.

It has been discovered further that for the preparation of the preferred sulphonates from sulphonic acids, such sulphonic acids should be substantially free of those metals which according to the second preceding table indicate less desirable corrosion characteristics, lead and iron sulphonates, which are usually present in commercial sulphonic acids, being particularly referred to. The preparation of such substantially pure sulphonic acids forms the subject matter of a patent application to be later filed, and such is identified as the application of Lazar and Ruedrich, Serial No. 198,976, filed March 30, 1938, which issued October 15, 1940, as Patent No. 2,218,174.

Sulphonic acids derived from the sulphonation of a 95 vis. S. U. @ 100° F. stock which yielded metal sulphonates giving excellent results, were found to have the following characteristics:

Molecular weight _____ 404
Sp. grav. @ 60° F _____ 1.0890
Refractive index at 20° F _____ 1.5120
Composition:
    Carbon _____ 70.33% by weight
    Hydrogen _____ 9.21% by weight
    Sulphur _____ 8.34% by weight
    Oxygen _____ 12.12% by weight The above composition corresponds to the formula $$C_{24}H_{35}SO_3H$$

In the incorporation of metal sulphonates in oils the soaps may be compounded directly under the influence of heat and suitable agitation. It is preferred, however, to add the free sulphonic acid to the oil and saponify with the metal oxide or hydroxide or an alkaline salt of a metal, while agitating with or without added heat. It is thus found that greater ease of preparation of soap stocks, containing high percentages of metal soap, is possible through the use of this procedure.

The range of metal soap content of the oil may vary from a trace up to the point at which the compounded lubricant is still fluid at 70° F. It is found, for instance, that lubricants containing, say, 10% calcium sulphonate are fluid before and after subjection to severe heat conditions, whereas other soaps, as, for example, calcium naphthenate, do not possess such characteristics, as they form a solid rubbery or tacky mass after use.

In general, it is preferred to incorporate the metal soap in the range of .001 to 3.0% by weight of the base oil, but such range may be higher or lower depending on the desired use of the lubricant. While 1% or 0.9% has been used in the preceding illustrative tables, such percentages are primarily used as a datum line from which comparisons can be made, and when 1% is used in the claims in conjunction with "of the order of," the qualification is used in the French sense, that is, it means more than 0.1% and less than 10%.

In the preparation of lubricants, it is preferred to incorporate a large amount of metal soap in the oil and then add this soap stock to batches of base oil in the correct percentages. In the use of such a procedure it is found that a soap stock which contains organic impurities of an undesirable nature can be rendered more stable by distillation under vacuum and removal of 10 to 30% of the oil. This overhead product is usually discarded and the residual soap stock used for blending purposes. The process is of value in obtaining a soap of improved heat stability and is a means of ridding a soap stock, such as calcium naphthenate, for example, of unstable acidic constituents of a corrosive nature, or constituents which are formed by the partial decomposition of the soap when it is subjected to higher temperatures. Such operation is rarely necessary on metal sulphonate soap stocks but may be resorted to if control tests should ever indicate a necessity for it.

The above described process of stabilization is not necessarily limited to soap stocks as a lubricant containing metal soaps in any percentage may be so treated. For example, a lubricant containing 1% calcium naphthenate may be distilled under vacuum and up to about 30% of the oil removed as a distillate. Such distillate will contain undesired acidic constituents and the bottoms will be the stabilized lubricant.

In the description of the invention, the excellent properties of lubricants containing metal sulphonates have been disclosed. There is a property of the compounded lubricant, however, which although commented on heretofore, has not been particularly stressed, and that is, the effect of the addition of metal sulphonates on the viscosity of the base oil. This feature may be better illustrated by referring to the curves in Fig. 5. These curves were obtained by incorporating one per cent by weight of neutral calcium soaps, when such is possible, in a base oil and the viscosity of the compounded lubricant determined. When the neutral soap could not be blended in 1% concentration it was necessary to add free organic acid to the combination of soap and oil and through the action of such free acidity it was possible to incorporate the desired amount of soap. The free acid used in each case was the particular acidic constituent of the metal soap, the properties of which were being investigated.

Starting with 1% concentration of soaps, free acid was added in increments to each lubricant, and the viscosities taken after each addition. These viscosities were plotted against per cent free acidity. Free acidity was measured by the amount of KOH (potassium hydroxide) which was required to neutralize the oil, when titrated cold in proper dilution and with phenolphthalein as indicator.

Examination of the curves will show that it was not possible to incorporate calcium oleate and calcium stearate in 1% concentrations without having a free acidity equivalent to .06 and 0.10 mgs. of KOH per gram of oil, respectively.

When lubricants containing 1% metal soaps are compared, it can be seen that the effect of the metal sulphonate on the viscosity of the base oil is relatively small. This feature is apparent in the following figures taken from the curves:

| Lubricant containing 1% of the following soaps | Viscosity S. U. at 210° F. | Free acidity, mgs. KOH/ gram of oil |
| --- | --- | --- |
| Calcium sulphonate | 55 | None |
| Calcium naphthenate | 58 | Trace |
| Calcium oleate | 62 | .06 |
| Calcium stearate | 64 | .105 |
| Base oil only | 54 | |

It is evident in the above tabulation that the increase in viscosity of the lubricant containing the metal sulphonate, when compared to similar lubricants utilizing other metal soaps, is relatively low. For ease of illustration the viscosities were taken at 210° F. When viscosities are taken at 130° or 100° F. the relative differences are naturally more marked.

The curves show further that in order to incorporate certain soaps in the base oil it is essential for free acidity to be present. When incorporating metal soaps derived from a given type of organic acid, e. g., saturated fatty acids, in a given concentration in an oil, the quantity of free acid which must be present increases with the molecular weight of the acidic component. For example, in Fig. 5, if we had chosen a soap made from a saturated fatty acid of higher molecular weight than stearic acid, a larger proportion of free acidity would be required to incorporate its calcium soap in 1% concentration.

As the free acidity of the blended lubricant is increased, the viscosity decreases. Such effect is apparent from the curves. The viscosity of each lubricant approaches the viscosity of the base oil through increased acidities, and this action is an indication of an approach to a true solution of soap in oil. It should be noted that the metal sulphonate lubricant is more nearly a true solution. Due to the property of high miscibility in oil of metal sulphonate, it is possible to employ neutral metal sulphonates in sufficient percentages to obtain the desired stabilizing effects. Through this property a lubricant can be made which is substantially non-corrosive, and which contains a high percentage of metal sulphonate.

When it is necessary to incorporate metal soaps in oil up to say 10% by weight, the superiority of metal sulphonates is more apparent. For example, in order to obtain a 10% calcium naphthenate lubricant a free acidity of about 0.3 is required. Comparative viscosities for calcium sulphonate lubricant and calcium naphthenate lubricant of such soap content are shown below.

| Lubricant containing— | Viscosity Saybolt Universal | | free acidity |
| --- | --- | --- | --- |
| | @ 130°F | @ 210°F | Mgs. KOH/ gm. oil |
| Mineral oil only | 217 | 54 | 0.01 |
| 10% calcium sulphonates | 242 | 59 | 0.05 |
| 10% calcium naphthenate | 431 | 76 | 0.32 |

The above table shows that the viscosity of a base oil is least affected by the addition of metal sulphonates, which is quite important when compounding, because it permits the use of a heavier base oil in the preparation of a given grade of lubricant. Further, the free acidity of the base oil compounded with metal sulphonate more closely approaches the free acidity of the base oil itself which is highly valuable due to the necessity of inhibiting corrosion.

In making the comparison of the last above table only the naphthenates could be used because other metal soaps are not miscible with the base oil at the high concentrations used and still higher concentrations of metal naphthenates and sulphonates could not be compared because the naphthenates have not the high degree of miscibility with oils above 10% which the metal sulphonates possess.

Problems relative to the lubrication of aviation engines are largely dependent on engine design and operating conditions. In practically every instance, however, lubricants of high stability at elevated temperatures are essential. In addition to stability the lubricant must have high "oiliness" characteristics. The use of the metal sulphonates in compounded oils provides the features of excellent heat stability and sludge inhibiting characteristics along with the property of a high degree of oiliness. Oils compounded with metal sulphonates show a high degree of oiliness on account of the pronounced polarity of the sulphonate molecule containing the strongly negative $RSO_3$ group. Lubricants containing the metal sulphonates are relatively less viscous and do not have the tendency to thicken when exposed to high temperatures. The thickening of an oil usually causes serious ring sticking. The combination of the above mentioned features with a high degree of miscibility in base lubricating oils makes compounded lubricants containing metal sulphonates particularly applicable for use in aviation engines.

We claim:
1. A process of making lubricating oils which comprises: adding free sulphonic acid to a mineral oil; then saponifying such acid by the addition of an alkaline salt of a metal in quantity sufficient to yield a substantially neutral soap of the metal ranging in percentage by weight of the oil from 10% up to a sufficient amount only to maintain the mixture fluid at about 70° F.; then subjecting the mixture to distillation under vacuum sufficient to remove about from 10% to 30% of the oil.

2. A liquid lubricant for internal combustion engines, including a body of mineral oil containing an active oxidation and corrosion inhibitor, the main constituent of said inhibitor being taken from the group consisting of calcium sulfonate, barium sulfonate, and strontium sulfonate, said lubricant being substantially free of metal salts which tend to increase materially the corrosion effect on alloy bearings of the cadmium-silver and copper-lead types.

3. The lubricant of claim 2 in which the inhibitor is present in amount up to 3%.

4. The lubricant of claim 2 in which the inhibitor is present in excess of 10%, thus making the lubricant suitable for use as a stock solution to be later diluted with additional mineral oil.

5. The lubricant of claim 2 in which the main constituent is calcium sulfonate.

6. The lubricant of claim 2 in which the body of mineral oil is of paraffin base type.

ARTHUR LAZAR.
PAUL MORITZ RUEDRICH.